United States Patent
Watanabe

(10) Patent No.: US 10,547,216 B2
(45) Date of Patent: Jan. 28, 2020

(54) POWER RECEIVING APPARATUS, POWER FEEDING SYSTEM, POWER FEEDING METHOD, POWER SOURCE MANAGEMENT METHOD, COMPUTER READABLE RECORDING MEDIUM STORING POWER FEEDING PROGRAM, AND COMPUTER READABLE RECORDING MEDIUM STORING POWER SOURCE MANAGEMENT PROGRAM

(71) Applicant: MITSUBISHI ELECTRIC CORPORATION, Tokyo (JP)

(72) Inventor: Kotaro Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/772,570

(22) PCT Filed: Dec. 25, 2015

(86) PCT No.: PCT/JP2015/086303
§ 371 (c)(1),
(2) Date: May 1, 2018

(87) PCT Pub. No.: WO2017/109963
PCT Pub. Date: Jun. 29, 2017

(65) Prior Publication Data
US 2019/0097469 A1 Mar. 28, 2019

(51) Int. Cl.
*H02J 50/80* (2016.01)
*H04B 5/00* (2006.01)

(52) U.S. Cl.
CPC ............ *H02J 50/80* (2016.02); *H04B 5/0037* (2013.01)

(58) Field of Classification Search
CPC ........ H02J 50/20; H02J 50/80; H04B 5/0037; H04L 12/10; H04L 12/28; H04L 12/2816
(Continued)

(56) References Cited

U.S. PATENT DOCUMENTS

2008/0100491 A1 5/2008 Umeda et al.
2009/0140690 A1 6/2009 Jung
(Continued)

FOREIGN PATENT DOCUMENTS

JP 2008-136175 A 6/2008
JP 2009-136132 A 6/2009
(Continued)

OTHER PUBLICATIONS

International Search Report for PCT/JP2015/086303 (PCT/ISA/210) dated Feb. 16, 2016.
(Continued)

*Primary Examiner* — Hal Kaplan
(74) *Attorney, Agent, or Firm* — Birch, Stewart, Kolasch & Birch, LLP

(57) ABSTRACT

A master station is a power feeding apparatus which transmits a power feeding signal that feeds power, to a slave station being a power receiving apparatus. The master station includes a wake-up time recording unit being a power-feeding-side storage unit, and a power-feeding-side determination unit. The power-feeding-side storage unit stores time information which specifies a start time at which data communication with the power receiving apparatus should be started. The power-feeding-side determination unit determines whether the start time specified by the time information is reached, and transmits the power feeding signal if it is determined that the start time is reached.

7 Claims, 13 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2009/0271048 | A1 | 10/2009 | Wakamatsu |
| 2011/0235800 | A1 | 9/2011 | Furukawa et al. |
| 2012/0001497 | A1 | 1/2012 | Sada et al. |
| 2012/0056485 | A1 | 3/2012 | Haruyama |
| 2012/0185708 | A1 | 7/2012 | Rekimoto et al. |
| 2013/0026851 | A1* | 1/2013 | Taguchi ............ H02J 13/0075 307/104 |
| 2014/0136742 | A1 | 5/2014 | Ooyabu et al. |
| 2015/0187491 | A1 | 7/2015 | Yanagawa |
| 2015/0249339 | A1 | 9/2015 | Van Wageningen et al. |
| 2016/0164338 | A1 | 6/2016 | Jung |
| 2017/0250576 | A1 | 8/2017 | Jung |

FOREIGN PATENT DOCUMENTS

| | | |
|---|---|---|
| JP | 2009-268311 A | 11/2009 |
| JP | 2011-211895 A | 10/2011 |
| JP | 2012-060721 A | 3/2012 |
| JP | 2013-247807 A | 12/2013 |
| JP | 2014-099802 A | 5/2014 |
| JP | 2015-042088 A | 3/2015 |
| JP | 2015-084608 A | 4/2015 |
| JP | 2015-128349 A | 7/2015 |
| JP | 2015-523848 A | 8/2015 |
| WO | WO 2011/048777 A1 | 4/2011 |
| WO | WO-2012/001959 A1 | 1/2012 |

OTHER PUBLICATIONS

Japanese Office Action dated Oct. 11, 2016 for Japanese Application No. 2016-553679, with machine translation.
Lu et al., "Wireless Networks With RF Energy Harvesting: A Contemporary Survey", IEEE Communications Surveys & Tutorials, 2015, vol. 17, No. 2, p. 757-789.
Seah et al., "Data Delivery Scheme for Wireless Sensor Network Powered by RF Energy Harvesting", IEEE Wireless Communications and Networking Conference, 2013, p. 1498-1503.
Taiwanese Office Action dated Apr. 19, 2017 for Taiwanese Application No. 105109990, with machine translation.
German Office Action for German Application No. 112015007160.1, dated Apr. 1, 2019, with English translation.

* cited by examiner

POWER RECEIVING APPARATUS, POWER FEEDING SYSTEM, POWER FEEDING METHOD, POWER SOURCE MANAGEMENT METHOD, COMPUTER READABLE RECORDING MEDIUM STORING POWER FEEDING PROGRAM, AND COMPUTER READABLE RECORDING MEDIUM STORING POWER SOURCE MANAGEMENT PROGRAM

TECHNICAL FIELD

The present invention relates to a power feeding apparatus of a master station being a wireless device which performs wireless communication and wireless power transmission, and a power receiving apparatus of a slave station being a wireless communication device which is powered by wireless power transmission from the master station and performs wireless data communication with the master station.

BACKGROUND ART

In a system typically represented by a wireless sensor network in which a large number of wireless communication devices are installed, there is a demand for non-use of power feeding wiring in order to reduce the installation cost and to enhance the flexibility of the installation place. As a method of realizing this demand, a method using wireless power transmission (wireless power feeding or rectenna) technology is available which feeds power using radio waves. The wireless power transmission technology is sometimes called wireless power feeding or rectenna.

There is a method that uses battery driving of a wireless communication device or power generation utilizing energy existing in the surrounding environment as the power source of the wireless communication device.

However, with the method that uses such battery driving or power generation as the power source, the wireless communication device must be able to operate continuously for a long time with a limited amount of electric power. Therefore, it is required for the wireless communication device to minimize its power consumption needed during operation.

Patent Literature 1 discloses a non-contact power transmission system. In the power transmission system of Patent Literature 1, the transmission time of electric power from a power transmission unit to a power receiving apparatus is segmented into a plurality of periods at predetermined intervals. Then, each power receiving apparatus is allocated to one of the segmented periods, and electric power is transmitted in the allocated period. Patent Literature 1 states this method enables stable electric power transmission to each power receiving apparatus.

However, when the power receiving apparatus is a sensor terminal, it is necessary to minimize the battery consumption of the sensor terminal. In the case of using wireless power transmission, it is necessary to minimize the power consumption in addition to stably feed electric power to the power receiving apparatus.

When slave stations operate intermittently, if the slave stations adopt time management of RTC (Real Time Clock), the intermittent cycles of the slave stations may undesirably be shifted from each other. Therefore, when the slave stations communicate in a time-sync manner, the communication timings are shifted. Then, the number of times of synchronization re-locking increases, leading to an increased power consumption.

CITATION LIST

Patent Literature

Patent Literature 1: JP 2009-268311 A

SUMMARY OF INVENTION

Technical Problem

It is an object of the present invention to reduce the power consumption of a wireless communication device to which power is fed in a wireless manner.

Solution to Problem

A power feeding apparatus of the present invention is a power feeding apparatus which transmits a power feeding signal that feeds power, to a power receiving apparatus, and includes:

a power-feeding-side storage unit storing time information which specifies a start time at which data communication with the power receiving apparatus should be started; and a power-feeding-side determination unit to determine whether the start time specified by the time information is reached and transmit the power feeding signal if it is determined that the start time is reached.

Advantageous Effects of Invention

The present invention is provided with a power-feeding-side storage unit storing time information which specifies a start time at which data communication with a power receiving apparatus should be started, and a power-feeding-side determination unit to transmit a power feeding signal based on the time information of the power-feeding-side storage unit. Therefore, power consumption of a wireless communication device to which power is fed in a wireless manner can be reduced.

DESCRIPTION OF EMBODIMENTS

Embodiment 1.

Figure 1:
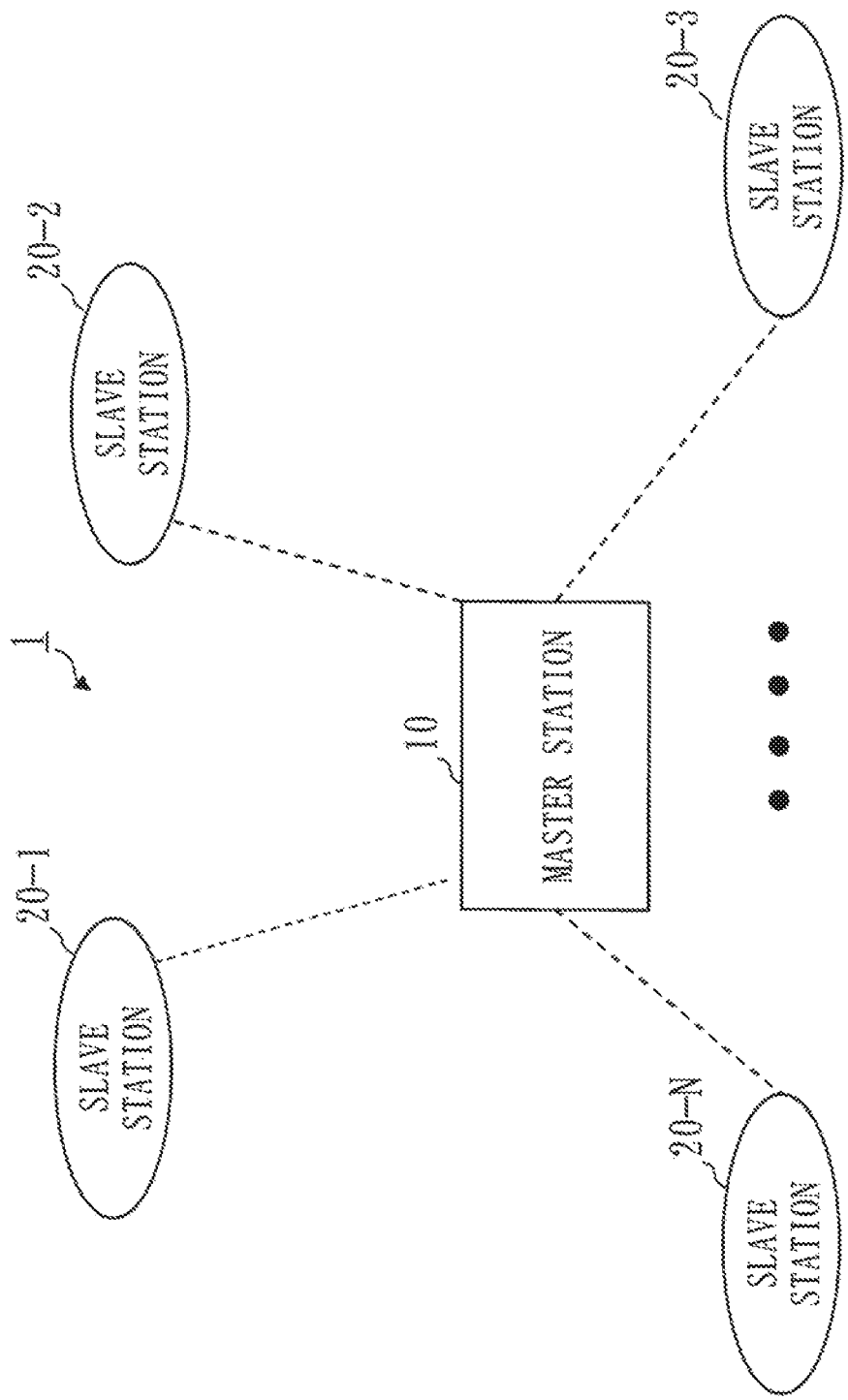
FIG. 1 for Embodiment 1 is a diagram illustrating a configuration of a power feeding system 1.

Embodiment 1 will be described with referring to FIGS. 1 to 8. FIG. 1 is a diagram illustrating a power feeding system 1 according to Embodiment 1. The power feeding system 1 is provided with a master station 10 and a plurality of slave stations 20. The master station is a power feeding apparatus. Each slave station is a power receiving apparatus. FIG. 1 illustrates N sets of slave stations 20-1 to 20-N. The master station 10 and each slave station 20 perform wireless data communication with each other. The master station 10 transmits a power feeding signal for feeding power to the slave station 20 in a wireless manner.

<*Explanation of Configuration*>

Figure 2:
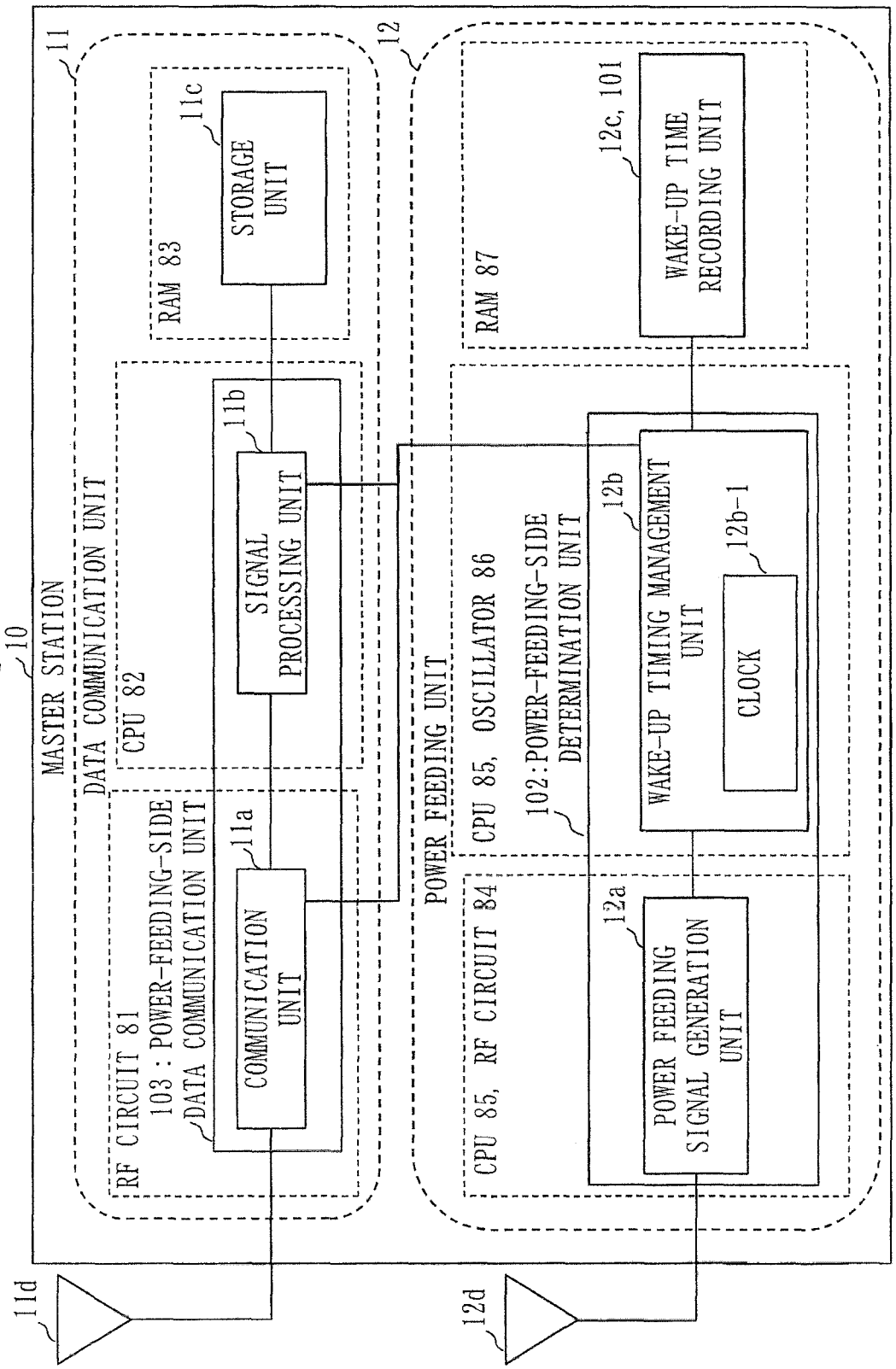
FIG. 2 for Embodiment 1 is a functional block diagram of a master station 10.

FIG. 2 is a functional block diagram of the master station 10. The master station 10 is provided with a data communication unit 11 which performs data communication with each slave station 20, and a power feeding unit 12 which transmits the power feeding signal. The data communication unit 11 is provided with a communication unit 11a, a signal processing unit 11b, a storage unit 11c, and an antenna 11d for data communication. The communication unit 11a transmits a data signal to the slave station 20 and receives a data signal from the slave station. The signal processing unit 11b performs signal processing on the data signal to transfer data to an external equipment. The communication unit 11a and the signal processing unit 11b constitute a power-feeding-side data communication unit 103. The power-feeding-side data communication unit 103 performs data communication with the power receiving apparatus. The power feeding unit 12 is provided with a power feeding signal generation unit 12a, a wake-up timing management unit 12b, a wake-up time recording unit 12c, and an antenna 12d for power feeding. The power feeding signal generation unit 12a generates the power feeding signal. The wake-up timing management unit 12b transmits a data communication instruction to the communication unit 11a and causes the power feeding signal generation unit 12a to start power feeding.

The wake-up time recording unit 12c stores the wake-up time of every one of the slave stations 20-1 to 20-N. The wake-up time recording unit 12c is a power-feeding-side storage unit 101. The power feeding signal generation unit 12a and the wake-up timing management unit 12b constitute a power-feeding-side determination unit 102.

Figure 3:
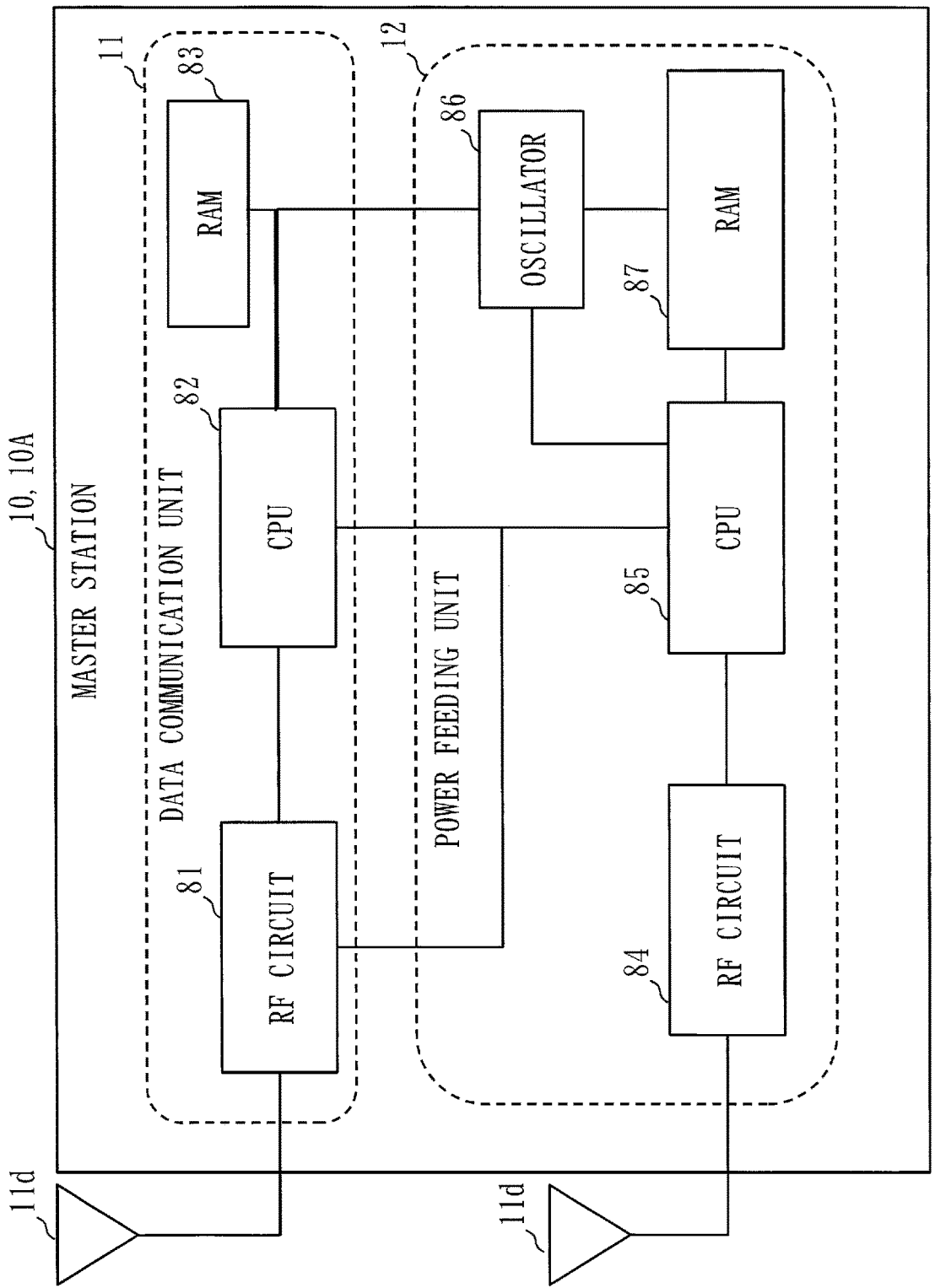
FIG. 3 for Embodiment 1 is a hardware configuration diagram of the master station 10.

FIG. 3 is a hardware configuration diagram of the master station 10. The master station 10 is provided with a radio-frequency circuit 81, a central processing unit 82, a RAM (Random Access Memory) 83, radio-frequency circuit 84, a central processing unit 85, an oscillator 86, and a RAM 87, as hardware. The high-frequency circuit will be referred to as RF circuit and the central processing unit will be referred to as CPU hereinafter. The data communication unit 11 is constituted of the RF circuit 81, the CPU 82, and the RAM 83. The power feeding unit 12 is constituted of the RF circuit 84, the CPU 85, the oscillator 86, and the RAM 87.

The correspondence between the hardware configuration diagram and the functional block diagram is as follows.

(1) The function of the communication unit 11a is implemented by the RF circuit 81.
(2) The function of the signal processing unit 11b is implemented by the CPU 82.
(3) The function of the storage unit 11c is implemented by the RAM 83.
(4) The function of the power feeding signal generation unit 12a is implemented by the RF circuit 84 and the CPU 85.
(5) The function of the wake-up timing management unit 12b is implemented by the CPU 85 and the oscillator 86.
(6) The function of the wake-up time recording unit 12c is implemented by the RAM 87.

Figure 4:
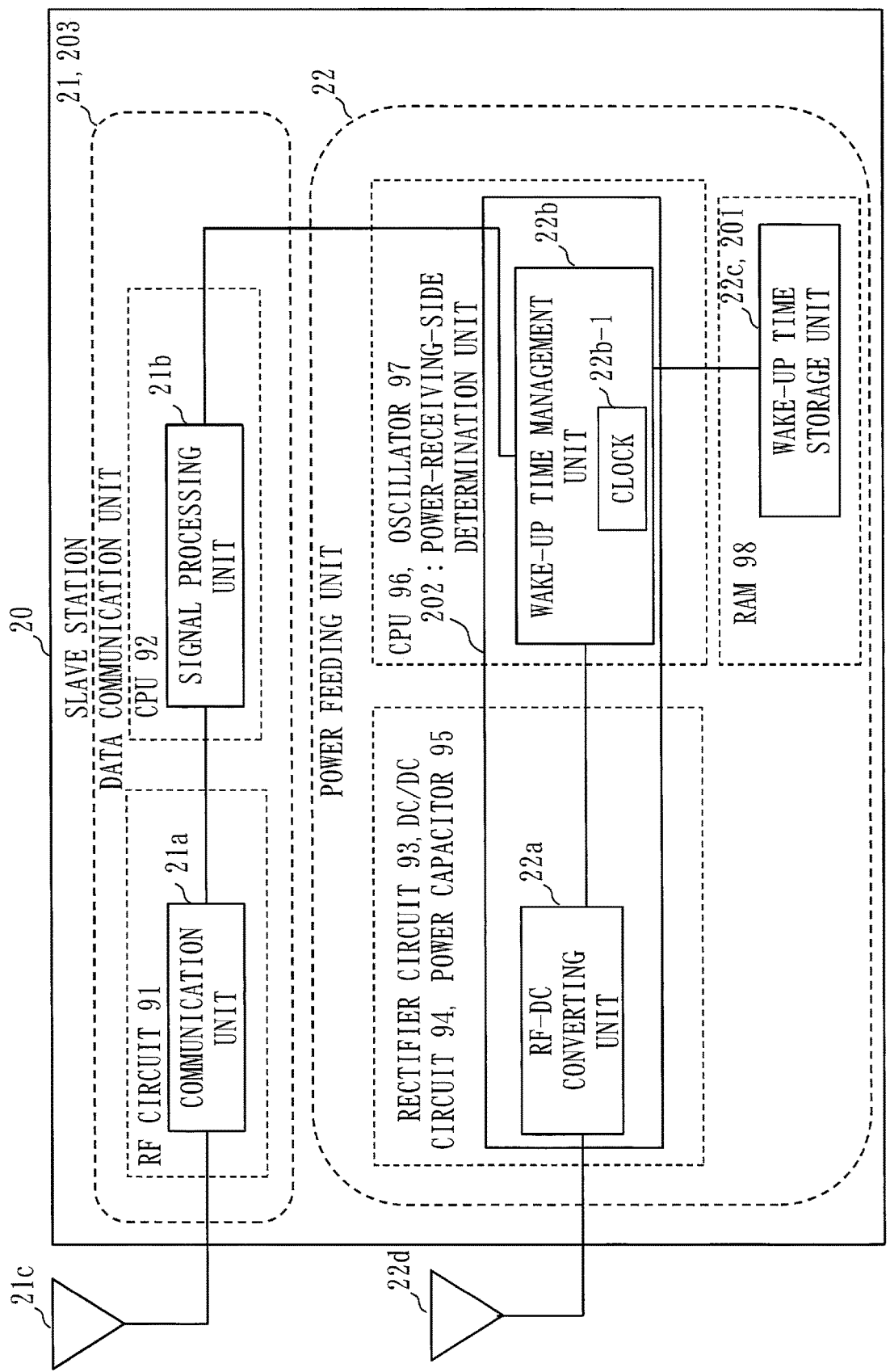
FIG. 4 for Embodiment 1 is a functional block diagram of a slave station 20.

FIG. 4 is a functional block diagram of the slave station 20. The slave station 20 is provided with a data communication unit 21 which performs data communication with the master station 10, and a power feeding unit 22 which feeds power to the slave station 20 in response to the power feeding signal from the master station 10. The data communication unit 21 performs data communication with the communication unit 11 a of the master station 10. If the data communication unit 21 does not perform data communication with the master station 10, the power source of the data communication unit 21 is turned off. The data communication unit 21 is provided with a communication unit 21a, a signal processing unit 21b, and an antenna 21c for data communication. The communication unit 21a transmits data to the master station 10 and receives data from the master station 10. The signal processing unit 21b performs signal processing on the wireless data signal to transfer data to an external equipment.

The power feeding unit 22 is provided with an RF-DC converting unit 22a, a wake-up time management unit 22b, a wake-up time storage unit 22c, and an antenna 22d which receives the power feeding signal transmitted by the master station 10. The wake-up time management unit 22b is provided with a clock 22b-1. The RF-DC converting unit 22a performs microwave to direct current conversion (RF-DC conversion) on the power feeding signal transmitted from the master station 10 and received by the antenna 22d and feeds the converted DC power to the slave station it belongs to. The wake-up time storage unit 22c stores wake-up time. The wake-up time management unit 22b monitors the feeding time of the power fed to the RF-DC converting unit 22a by the power feeding signal and compares the monitored feeding time with the time at which the slave station which it belongs to wakes up. If the monitored feeding time falls within a tolerance stored in the wake-up time storage unit 22c, the wake-up time management unit 22b turns on the power source of the data communication unit 21 to start data communication. The wake-up time management unit 22b also corrects the wake-up time stored in the wake-up time storage unit 22c to the power feeding time. The wake-up time storage unit 22c is a power-receiving-side storage unit 201. The RF-DC converting unit 22a and the wake-up time management unit 22b constitute a power-receiving-side determination unit 202. The data communication unit 21 is a power-receiving-side data communication unit 203.

Figure 5:
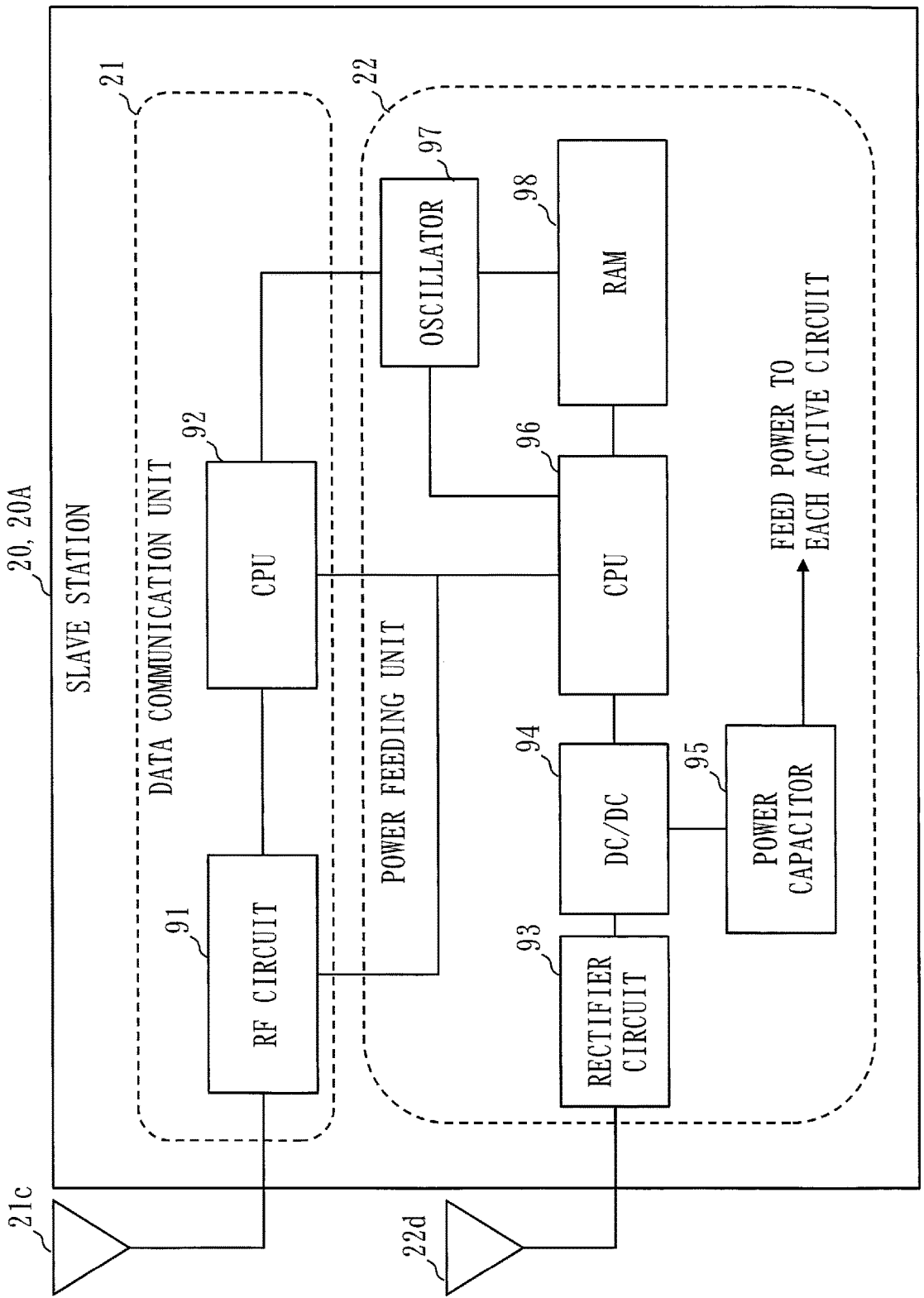
FIG. 5 for Embodiment 1 is a hardware configuration diagram of the slave station 20.

FIG. 5 is a hardware configuration diagram of the slave station 20-1. The slave station 20 is provided with an RF circuit 91, a CPU 92, a rectifier circuit 93, a DC/DC 94, a power capacitor 95, a CPU 96, an oscillator 97, and a RAM 98, as hardware. The DC/DC 94 is a converter to convert a DC voltage to a different DC voltage. The data communication unit 21 is constituted of the RF circuit 91 and the CPU 92. The power feeding unit 22 is constituted of the rectifier circuit 93, the DC/DC 94, the power capacitor 95, the CPU 96, the oscillator 97, and the RAM 98. The correspondence between the hardware configuration diagram and the functional block diagram is as follows.

(1) The function of the communication unit 21a is implemented by the RF circuit 91.
(2) The function of the signal processing unit 21b is implemented by the CPU 92.
(3) The function of the RF-DC converting unit 22a is implemented by the rectifier circuit 93, the DC/DC 94, and the power capacitor 95.
(4) The function of the wake-up time management unit 22b is implemented by the CPU 96 and the oscillator 97.
(5) The function of the wake-up time storage unit 22c is implemented by the RAM 98.

<*Explanation of Operation*>

Figure 6:
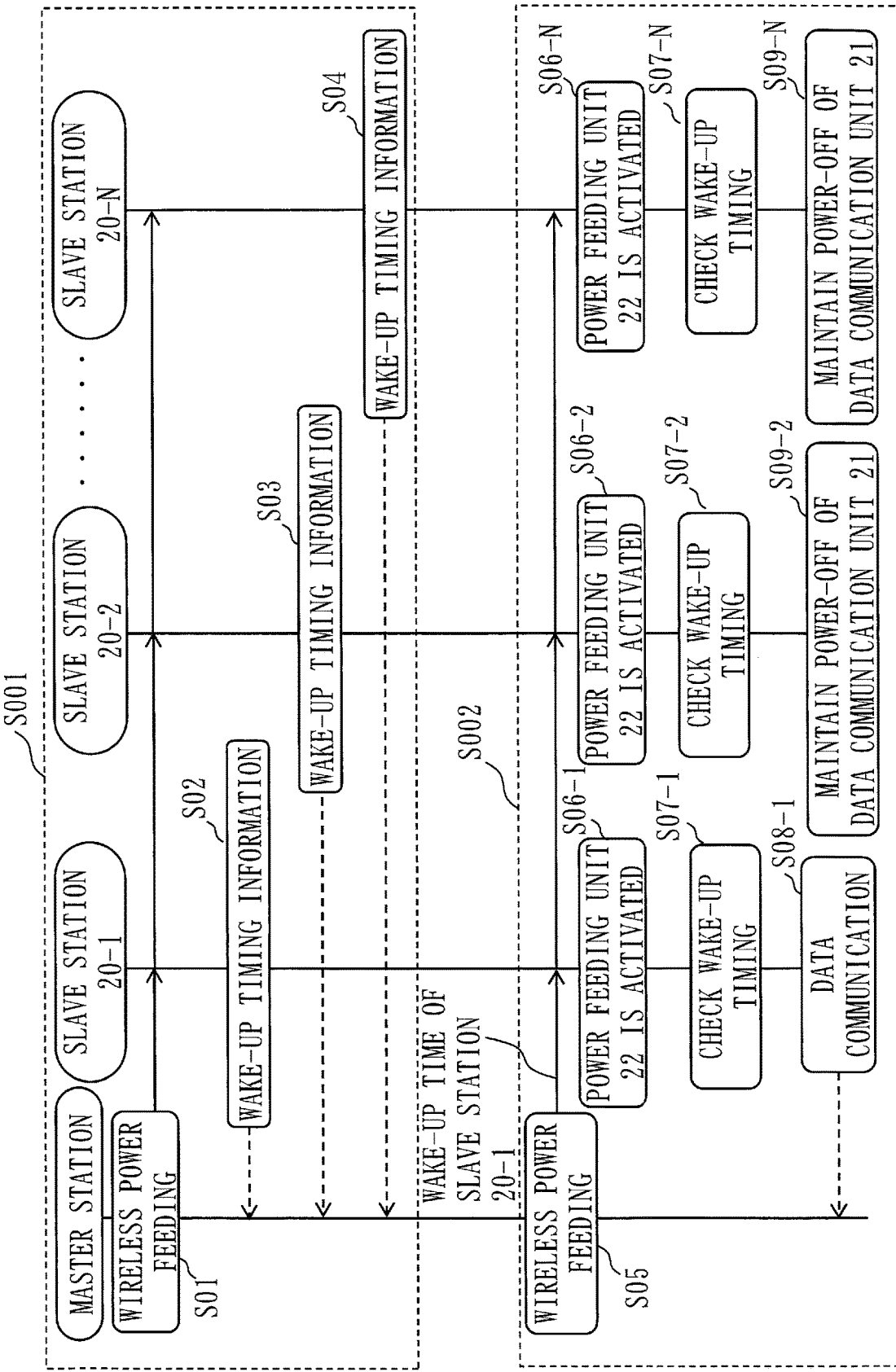
FIG. 6 for Embodiment 1 is a sequence diagram illustrating interaction between the master station 10 and the plurality of slave station 20.
Figure 7:
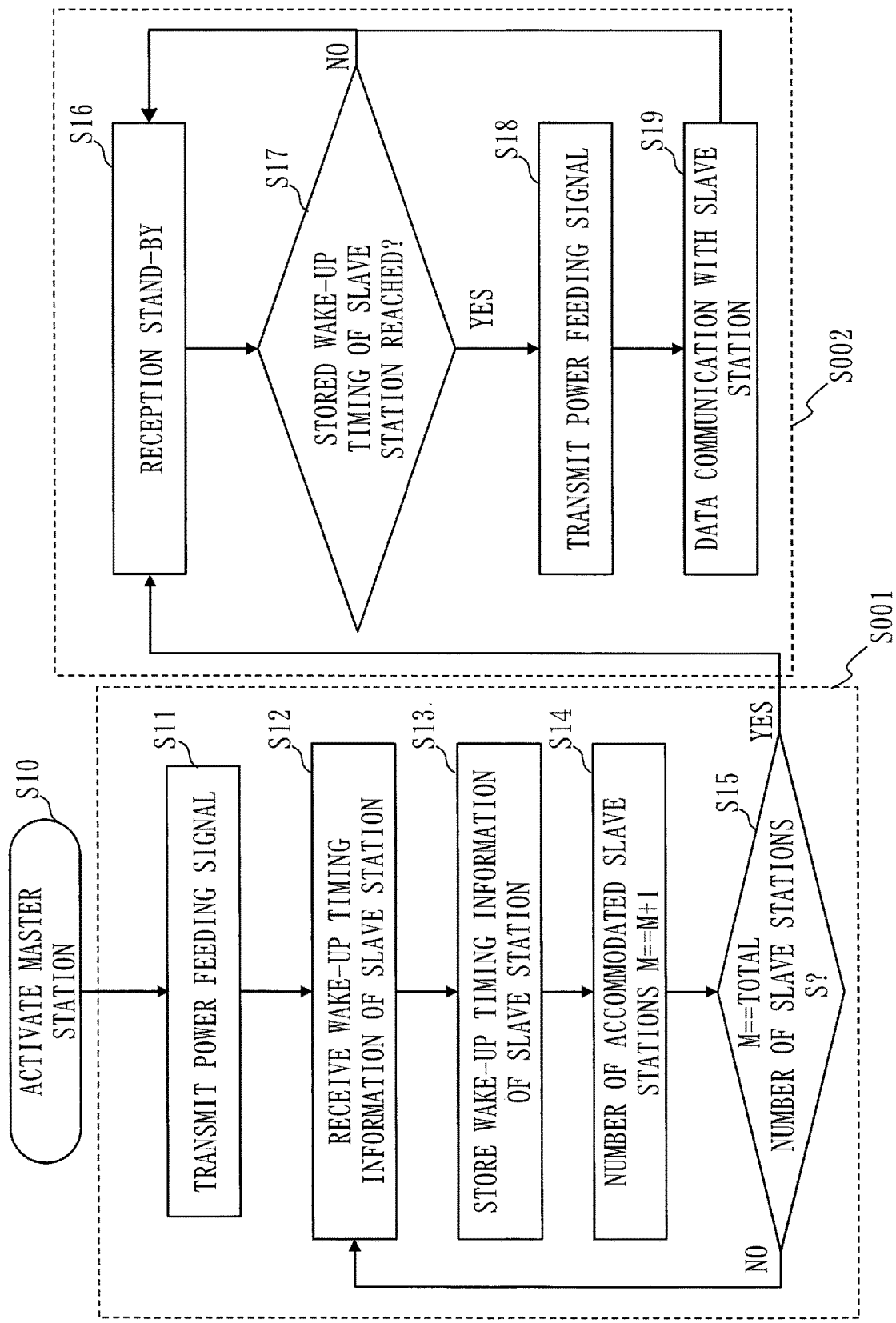
FIG. 7 for Embodiment 1 is a flowchart illustrating an operation of the master station 10.
Figure 8:
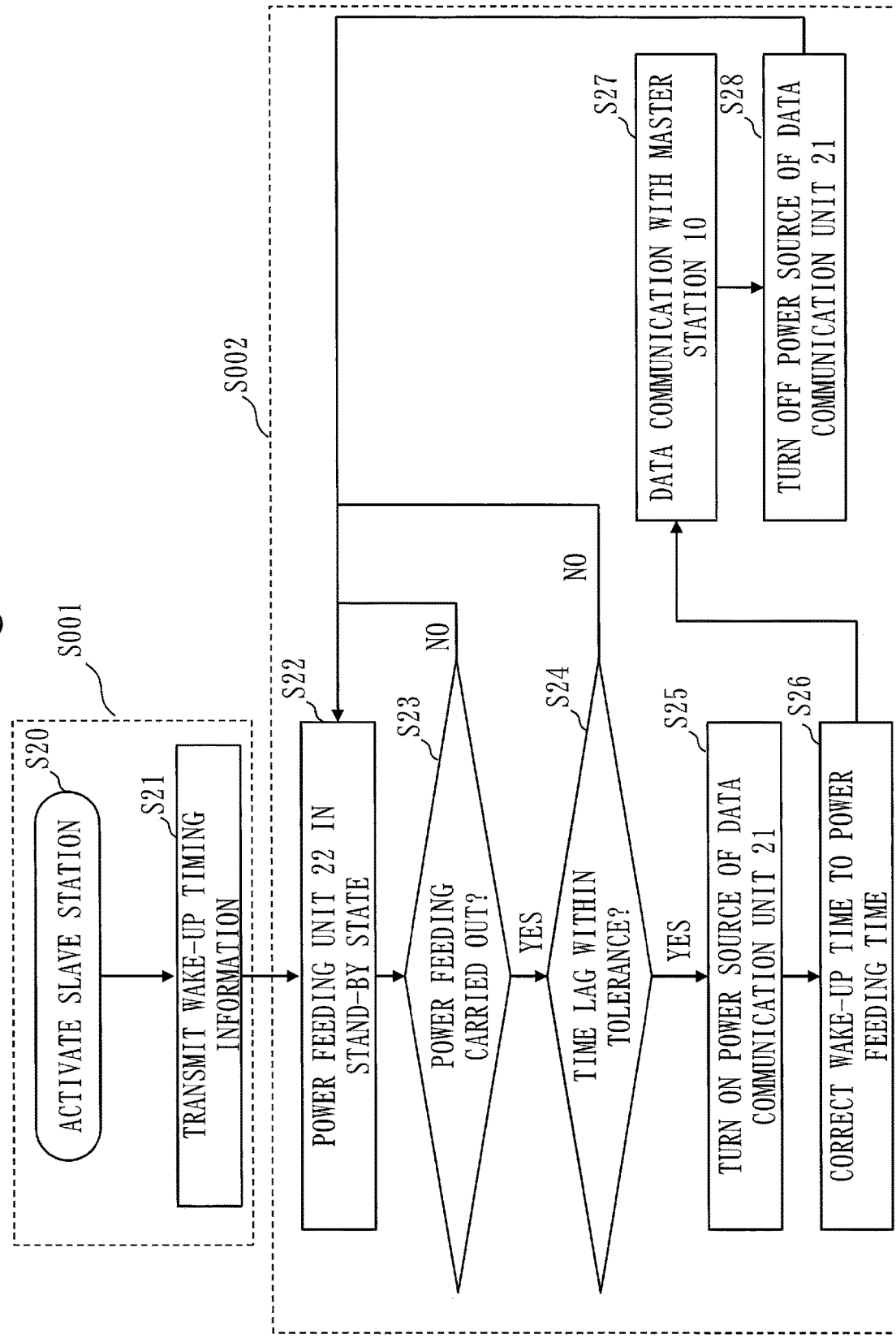
FIG. 8 for Embodiment 1 is a flowchart illustrating an operation of the slave station 20.

FIG. 6 is a sequence diagram illustrating interaction between the master station 10 and the plurality of slave stations 20. FIG. 7 is a flowchart illustrating an operation of the master station 10. FIG. 8 is a flowchart illustrating an operation example of the slave station 20. The communication operation between the master station 10 and the plurality of slave stations 20 will be described with referring to FIGS. 6 to 8.

First, the outline of the interaction between the master station 10 and the plurality of slave stations 20 will be described with referring to FIG. 6.

As illustrated in FIG. 6, interaction between the master station 10 and the plurality of slave station 20 is divided into accommodating process S001 of the slave station 20 illustrated on the upper side and power feeding process S002 on the lower side.

In accommodating process S001, the master station 10 collects wake-up timing information from each of the N sets of slave stations 20. In step S01, the master station 10 transmits the power feeding signal by first wireless power feeding. Inside each slave station 20, when the first power feeding signal is received, the data communication unit 21 and the power feeding unit 22 are activated. Then, in steps S02 through S04 and steps beyond, the data communication unit 21 of each slave station 20 transmits the wake-up timing information stored in the wake-up time storage unit 22c to the master station 10. After the transmission, the power source of the the data communication unit 21 of each slave station 20 is turned off.

In accommodating process S001, the master station 10 transmits the power feeding signal when it determines that there is a slave station 20 whose wake-up time is reached. Namely, the master station 10 transmits a second power feeding signal in step S05 by wireless power feeding when it determines that there is a slave station 20 whose wake-up time is reached. Wireless power feeding of step S05 corresponds to a case where the master station 10 determines that there is a slave station 20 whose wake-up time is reached, based on the wake-up timing information of each slave station 20 which is collected in steps S02 through S04 and steps beyond. In this case, it is sufficient for the master station 10 as far as it can recognize the existence of a slave station whose wake-up time is reached, and the master station 10 does not need to recognize specifically the wake-up time of which slave station 20 is reached. Wireless power feeding of step S05 corresponds to a case where the slave station 20 whose wake-up time is reached is the slave station 20-1. FIG. 6 indicates a case where in step S002 the wake-up time of the slave station 20-1 is reached. The master station 10 transmits a power feeding signal (step S05) when it determines that the wake-up time of any one slave station 20 is reached.

In the case of second wireless power feeding, that is, in the case of wireless power feeding in power feeding process S002, the slave station 20 operates differently from in accommodating process S001. In wireless power feeding of accommodating process S001, when the slave station 20 receives a power feeding signal, the power sources of the data communication unit 21 and power feeding unit 22 are turned on upon reception of of the power feeding signal as a trigger, and the data communication unit 21 transmits wake-up timing information to the master station 10. However, in the case of wireless power feeding of power feeding process S002, inside the slave station 20, only the power feeding unit 22 is activated and the power source of the data communication unit 21 stays off (steps S06-1, S06-2, and S06-N). The wake-up time management unit 22b determines if the time at which power is fed by the master station 10 and the time specified from the wake-up timing information stored in the wake-up time storage unit 22c coincide (steps S07-1, S07-2, and S07-N). If the wake-up time management unit 22b determines that coincidence is established, it turns on the power source of the data communication unit 21 so the data communication unit 21 starts data communication with the master station 10 (step S08-1). If the wake-up time management unit 22b determines that coincidence is not established, it keeps the power-off state of the data communication unit 21 (steps S09-2, S09-N).

The power feeding signal of accommodating process S001 and the power feeding signal of power feeding process S002 are the same. That is, in accommodating process S001 and power feeding process S002, the same power feeding signal is transmitted to the slave stations 20. This power feeding signal may sometimes be called a common power feeding signal hereinbelow. In each slave station 20, the power feeding signal of accommodating process S001 and the power feeding signal of power feeding process S002 are differentiated from each other in the following manner. The wake-up time management unit 22b of the slave station 20 can discriminate between wireless power feeding of accommodating process S001 and wireless power feeding of power feeding process S002. More specifically, the wake-up time management unit 22b records in the wake-up time storage unit 22c the number of times N the power feeding signal is received. If N=1, the wake-up time management unit 22b determines that this corresponds to accommodating process S001 where the power feeding signal is recorded for the first time. If N=2 or more, the wake-up time management unit 22b determines this corresponds to power feeding process S002.

Alternatively, instead of storing the number of times N the power feeding signal is received in the wake-up time storage unit 22c and waiting for reception of the power feeding signal, the slave station may autonomously perform accommodating process S001 when the wake-up time of the wake-up time storage unit 22c is reached, and may determine that the process after accommodating process S001 is power feeding process S002. Namely, instead of waiting for reception of the power feeding signal, the slave station autonomously transmits wake-up information to the master station when the wake-up time of the slave station is reached. Then, the slave station determines that the process to perform after transmission of the wake-up timing information is power feeding process S002.

The operation of the master station 10 will be described with referring to FIG. 7. In FIG. 7, a process corresponding to accommodating process S001 and a process corresponding to power feeding process S002 are each indicated by a broken-line frame.

In step S10, inside the master station 10, the power sources of the data communication unit 11 and power feeding unit 12 are turned on so that the data communication unit 11 and the power feeding unit 12 are activated.

In step S11, the power feeding signal generation unit 12a transmits the power feeding signal. Step S11 corresponds to step S01. Inside the slave station 20, when the first power feeding signal is received, the data communication unit 21 and the power feeding unit 22 are activated, and the data communication unit 21 transmits the wake-up timing information. More specifically, the wake-up time management unit 22b of the slave station 20 detects reception of the first power feeding signal via the RF-DC converting unit 22a. Upon this detection as a trigger, the wake-up time management unit 22b transmits the wake-up timing information stored in the wake-up time storage unit 22c with using the communication unit 21a.

In step S12, inside the master station 10, the communication unit 11a receives the wake-up timing information transmitted by each slave station 20 via the antenna 11d. The wake-up timing information includes information of the wake-up time, information of the wake-up interval, and information of an identification number for identifying the slave station 20. The identification number is an example of identification information. The identification information may be information other than an identification number as far as it can specify a slave station. The wake-up timing information is time information that specifies the start time at which data communication with the power receiving apparatus should be started. The wake-up time is information such as 15 h 00 min 00 s. The wake-up interval is information such as 5 hours. With using the identification number, the master station 10 transmits response data notifying reception completion of the wake-up timing information, to the slave station 20 having that identification number. The slave station 20 that has received the response data turns off the power source of the data communication unit 21. In Embodiment 1, it is assumed that the wake-up timing information includes identification number. However, a configuration in which the wake-up timing information does not include identification will also apply. If the wake-up timing information does not include identification information, the master station 10 that has received wake-up timing information does not transmit response data, and inside the slave station 20 that has transmitted wake-up timing information, the power source of the data communication unit 21 is turned off after transmission of the wake-up timing information. After the communication unit 11a receives the wake-up timing information, the signal processing unit 11b reads identification number, wake-up time, and wake-up interval from the wake-up timing information and transmits them to the wake-up timing management unit 12b.

In step S13, the wake-up timing management unit 12b stores the identification number, wake-up time, and wake-up interval of the slave station 20, in the wake-up time recording unit 12c.

In step S14, the signal processing unit 11b increments a number M of accommodated sets of slave stations 20 by 1. In step S15, the signal processing unit 11b determines whether a number S of accommodated sets being the number of all slave stations and the number M of accommodated sets coincide. If the number S of accommodated sets and the number M of accommodated sets do not coincide, the operations of steps S12 through S14 are repeated. The number S of accommodated sets is stored in the storage unit 11c. The signal processing unit 11b records the number M of accommodated sets in the storage unit 11c, reads the recorded number M of accommodated sets and the preset number S of accommodated sets from the storage unit 11c, and compares the number M of accommodated sets and the number S of accommodated sets, to perform determination of step S15.

If in step S15 the signal processing unit 11b determines that the number M of accommodated sets and the number S of accommodated sets coincide, then in step S16 the master station 10 is set in a reception waiting state.

In step S17, with using a clock 12b-1, the wake-up timing management unit 12b determines whether the wake-up timing being the time at which one of the plurality of slave stations should wake up coincides with the current clock with referring to the wake-up time and wake-up interval, recorded in the wake-up time recording unit 12c, of each of the plurality of slave stations. The wake-up timing is the time obtained by wake-up time+(integer×wake-up interval) where the integer is 0 or more. Note that the clock 12b-1 is implemented by the CPU 85 and the oscillator 86.

If the wake-up timing management unit 12b determines that the current clock time coincides with the wake-up time of one of the plurality of slave stations (YES in step S17), the power feeding signal generation unit 12a starts transmission of the power feeding signal in step S18. The wake-up time of the slave station is the start time at which data communication should start. In this example, assume that the wake-up time of the slave station 20-1 coincides with the current clock time. After the power feeding signal is transmitted by the power feeding signal generation unit 12a, in step S19, the master station 10 performs data communication with the slave station 20-1. More specifically, when the slave station 20-1 receives power feeding signal in step S18, the slave station 20-1 transmits a data signal. This operation corresponds to step S08-1 of FIG. 6 and step S27 of FIG. 8 which is to be described later. The communication unit 11a of the master station 10 receives the data signal transmitted from the slave station 20-1, via the antenna 11d. The signal processing unit 11b processes the received data signal. When data communication with the slave station 20 ends, the processing returns to step S16.

The operation of the slave station 20 will now be described with referring to FIG. 8. In FIG. 8, a process corresponding to accommodating process S001 and a process corresponding to power feeding process S002 are each indicated by a broken-line frame.

In step S20, inside each slave station 20, when the power feeding signal (corresponding to accommodating process S001) is received from the master station 10, the sources of the data communication unit 21 and power feeding unit 22 are turned on.

In step S21, the data communication unit 21 transmits wake-up timing information to the master station 10. More specifically, the signal processing unit 21b acquires the wake-up timing information stored in the wake-up time storage unit 22c via the wake-up time management unit 22b, and transmits the acquired wake-up timing signal via the communication unit 21a. The wake-up timing information includes the wake-up time and wake-up interval, as described in the description of step S12.

In step S22, when response data is received from the master station 10 that has received the wake-up timing information, the slave station 20 turns off the power source of the data communication unit 21 and keeps only the power feeding unit 22 in a power-on state. More specifically, the signal processing unit 21b determines whether response data addressed to the slave station which it belongs to is received. If the signal processing unit 21b determines that such response data is received, the wake-up time management unit 22b turns off the power source of the data communication unit 21.

In step S23, the wake-up time management unit 22b determines whether power is fed from the master station 10 by wireless power feeding with an output signal from the RF-DC converting unit 22a. That is, the wake-up time management unit 22b determines whether a power feeding signal is received.

If the wake-up time management unit 22b determines that a power feeding signal is received (YES in step S23), then in step S24, the wake-up time management unit 22b compares the time at which power feeding is performed and the wake-up timing specified from the wake-up timing information preset in the wake-up time storage unit 22c, with using a clock 22b-1. The wake-up timing is a time obtained by wake-up time+(integer×wake-up interval) where integer is 0 is more. The wake-up time and the wake-up interval are determinative information for determining whether data communication should be started. Of the determinative information, the wake-up time and the wake-up interval are also time information for determining whether data communication should be started. The clock 22b-1 is implemented by the CPU 96 and the oscillator 97. In step S24, the wake-up time management unit 22b determines whether the time lag between the time at which power feeding is performed and the wake-up timing falls within the range of ±M seconds being a preset tolerance. The range of ±M seconds is stored as data in the wake-up time storage unit 22c.

If the time lag falls within the range of ±M seconds (YES in step S24), in step S25, the wake-up time management unit 22b turns on the power source of the data communication unit 21.

Furthermore, in step S26, the wake-up time management unit 22b overwrites the power feeding time with the wake-up time which is stored in the wake-up time storage unit 22c as part of the "wake-up timing information" (step S26). The power feeding time is the time at which the wake-up time management unit 22b turns on the power source of the data communication unit 21 in step S25. The power feeding time may be another time. An example of another time may be the time at which the wake-up time management unit 22b detects reception of the power feeding signal in step S23 via the RF-DC converting unit 22a.

In step S27, inside the data communication unit 21 whose power source is ON, the signal processing unit 21b performs data communication with the data communication unit 11 of the master station 10.

In step S28, when data communication by the signal processing unit 21b ends, the wake-up time management unit 22b turns off the power source of the data communication unit 21. The wake-up time management unit 22b also sets the power feeding unit 22 to the waiting state. Then, steps S22 through S28 are repeated.

<*Effect of Embodiment 1*>

As described above, according to Embodiment 1, the master station 10 manages the wake-up timing of the slave station 20 and performs wireless power feeding according to the wake-up timing of the slave station 20. Inside the slave station 20, the power feeding unit 22 is activated at the timing of wireless power feeding from the master station 10. If the wake-up timing falls within the preset time tolerance, the power source of the data communication unit 21 is turned on so that the data communication unit 21 starts data communication. Thus, sync deviation of the intermittent period among slave stations can be decreased. As the sync deviation of the intermittent period is decreased, the number of times of synchronization re-locking decreases, suppressing the power consumption of the slave station.

Embodiment 2.

According to the configuration of Embodiment 1, the master station 10 manages the wake-up timing of the slave station 20 and performs wireless power feeding in accordance with the wake-up timing of the slave station 20. This can decrease the sync deviation of the intermittent period and suppress the power consumption. In Embodiment 2, the master station 10 designates the slave station 20 to be woken up and wireless power feeding simultaneously by changing the signal pattern of the power feeding signal for the identification number of each slave station 20. That is, the identification information of the slave station 20 is reflected in the power feeding signal that is not a data signal, so that the slave station 20 recognizes the power feeding signal as the power feeding signal addressed to itself. Consequently, the clock 22b-1 which is necessary in Embodiment 1 becomes unnecessary. In the slave station 20, clock driving during waiting in power feeding process S002 becomes unnecessary, so that clock driving power becomes unnecessary. As a result, the power consumption of the slave station 20 can be further suppressed.

In Embodiment 2, the wake-up timing information essentially includes the identification number of the slave station 20. Also, in the slave station 20, the clock that is necessary in Embodiment 1 is not necessary during waiting in power feeding process S002.

Embodiment 2 will be described with referring to FIGS. 9 to 13. The system configuration of Embodiment 2 is the same as the system configuration of FIG. 1 of Embodiment 1, but in Embodiment 2, a master station is referred to as a master station 10A and a slave station is referred to as a slave station 20A. Hence, in Embodiment 2, the master station 10 and the slave stations 20-1, . . . , 20-N of FIG. 1 will be the master station 10A and the slave stations 20A-1, . . . , 20A-N. Differences from Embodiment 1 will be described hereinafter.

Figure 9:
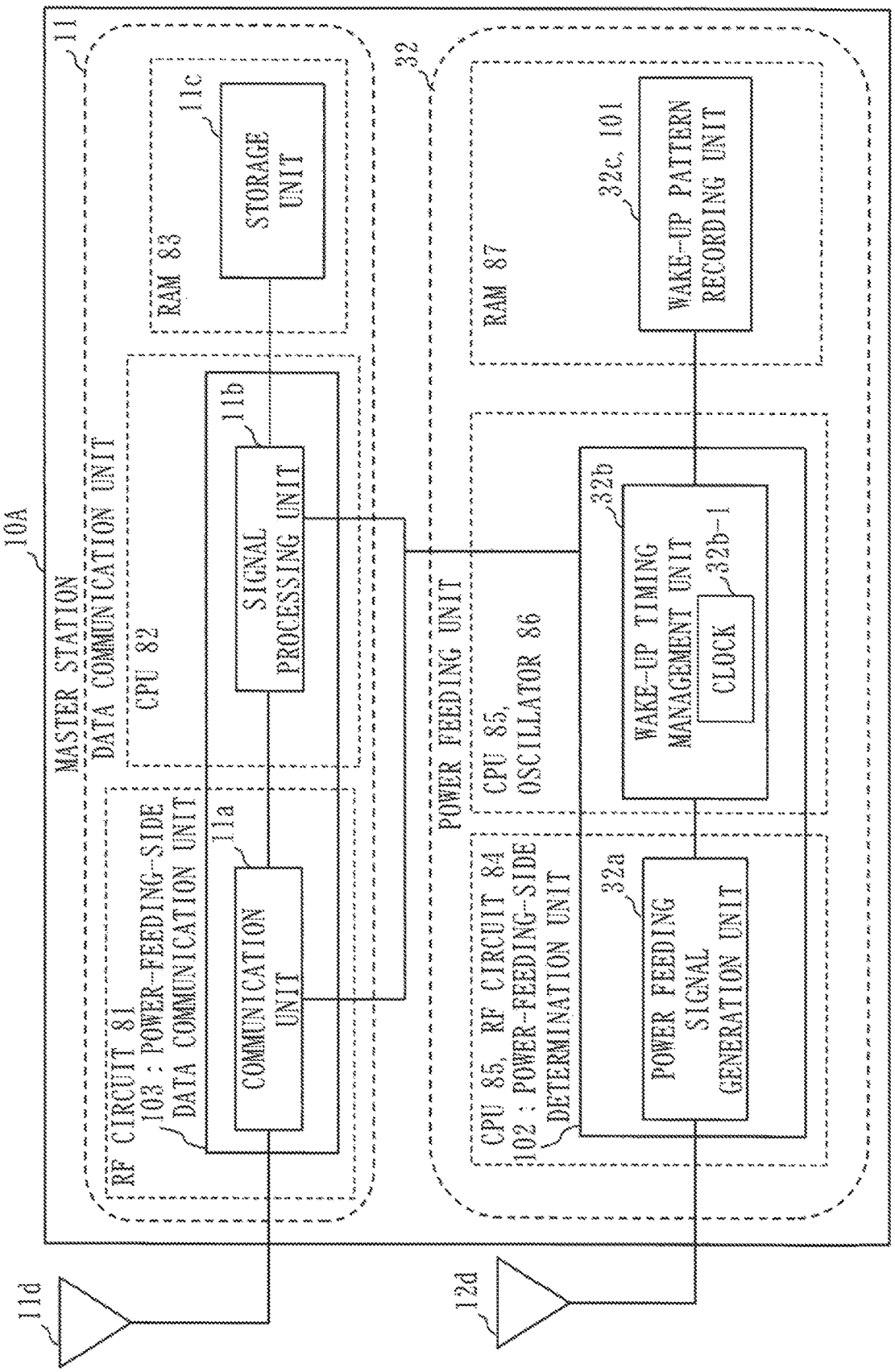
FIG. 9 for Embodiment 2 is a block diagram of a master station 10A.

FIG. 9 is a functional block diagram of the master station 10A according to Embodiment 2. The master station 10A is provided with a data communication unit 11 and a power feeding unit 32. The data communication unit 11 is the same as its counterpart in Embodiment 1. The power feeding unit 32 is provided with a power feeding signal generation unit 32a, a wake-up timing management unit 32b, and a wake-up pattern recording unit 32c. The wake-up timing management unit 32b is provided with a clock 32b-1.

(1) The power feeding signal generation unit 32a generates a power feeding signal having a signal pattern corresponding to the identification number of the slave station 20A to be woken up and transmits the generated power feeding signal having that pattern. The signal pattern corresponding to the identification number will be referred to as a power feeding pattern hereinafter. The power feeding pattern is the transmission pattern of the power feeding signal.

(2) When the wake-up timing of one slave station 20A is reached, the wake-up timing management unit 32b causes the power feeding signal generation unit 32a to start transmission of a power feeding signal having a power feeding pattern for the slave station 20A being the target.

(3) The wake-up pattern recording unit 32c records the wake-up timing information of all the slave stations 20A accommodated in the master station 10A.

The wake-up pattern recording unit 32c is a power-feeding-side storage unit 101. The power feeding signal generation unit 32a and the wake-up timing management unit 32b constitute a power-feeding-side determination unit 102. A communication unit 11a and a signal processing unit 11b constitute a power-feeding-side determination unit 102. A communication unit 11 a and a signal processing unit 11b constitute a power-feeding-side data communication unit 103.

The hardware configuration of the master station 10A can be implemented by the hardware configuration illustrated in FIG. 3, as the master station 10 of Embodiment 1 is. More specifically, the hardware configuration is as follows.
(1) The data communication unit 11 is the same as its counterpart in Embodiment 1.
(2) The function of the power feeding signal generation unit 32a is implemented by a CPU 85 and an RF circuit 84.
(3) The function of the wake-up timing management unit 32b is implemented by the CPU 85 and an oscillator 86.
(4) The function of the wake-up pattern recording unit 32c is implemented by a RAM 87.

Figure 10:
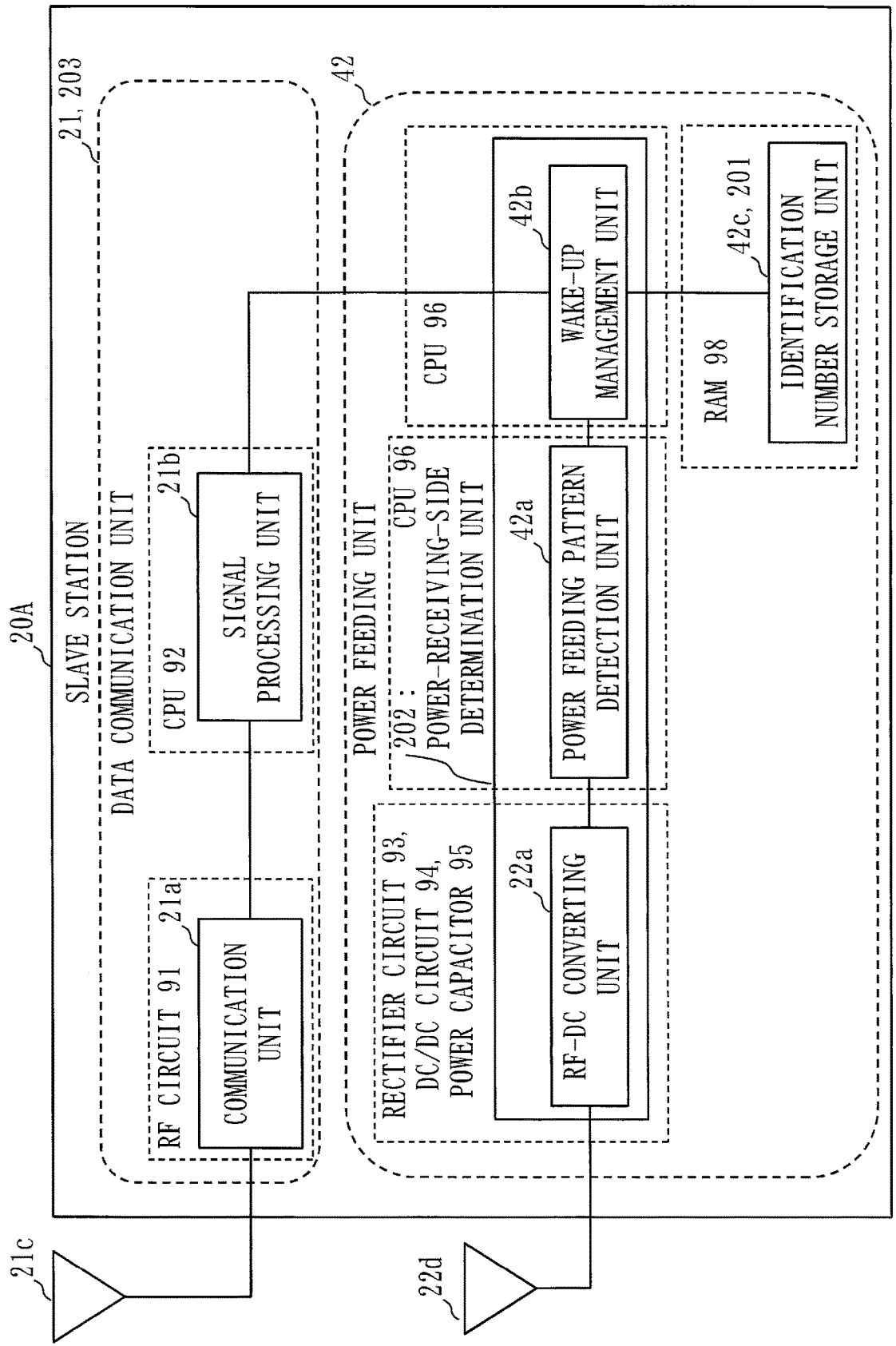
FIG. 10 for Embodiment 2 is a block diagram of a slave station 20A.

FIG. 10 is a functional block diagram of the slave station 20A of Embodiment 2. The slave station 20A is provided with a data communication unit 21 and a power feeding unit 42. The data communication unit 21 is the same as its counterpart of Embodiment 1.

The power feeding unit 42 is provided with an RF-DC converting unit 22a, a power feeding pattern detection unit 42a, a wake-up management unit 42b, and an identification number storage unit 42c.
(1) The power feeding pattern detection unit 42a detects the power feeding pattern of the RF-DC converting unit 22a and recognizes the identification number of the slave station 20 from the power feeding pattern.

The power feeding pattern detection unit 42a may detect only the power feeding pattern, or may detect the power feeding pattern and further recognize the identification number from the power feeding signal. The information of the power feeding pattern is stored in the identification number storage unit 42c as will be described later. In cases where only the power feeding pattern is detected, when the power feeding pattern matches, the power source of the data communication unit 21 of the slave station is turned on. Regarding the operation of the slave station of FIG. 13 to be described later, a case where the identification number is recognized from the power feeding pattern is described. If only the power feeding pattern is detected, in FIG. 13, step S44 becomes unnecessary, and step S45 will be "power feeding pattern matches?".
(2) The wake-up management unit 42b determines whether the identification number or power feeding pattern recognized by the power feeding pattern detection unit 42a is its own identification number or its own power feeding pattern. If the determination result indicates that the recognized identification number program or power feeding pattern is its own identification number program or its own power feeding pattern, the wake-up management unit 42b turns on the power source of the data communication unit 21.
(3) The identification number storage unit 42c stores information of the identification number and power feeding pattern of the station which it belongs to, namely the slave station 20A which the identification number storage unit 42c belongs to. The stored information of the power feeding pattern is information that can specify the power feeding pattern of the receiving power feeding signal. More specifically, if the recognized power feeding pattern corresponds to <Case 1>described later, it is the information of a power transmission period. If the recognized power feeding pattern corresponds to <Case 2>described later, it is the information of on/off pattern. If the recognized power feeding pattern corresponds to <Case 3>, it is the information of the propagation characteristic of the radio waves.

The identification number storage unit 42c is a power-receiving-side storage unit 201. The RF-DC converting unit 22a, the power feeding pattern detection unit 42a, and the wake-up management unit 42b constitute a power-receiving-side determination unit 202. The data communication unit 21 is a power-receiving-side data communication unit 203.

The hardware configuration of the slave station 20A can be implemented by the hardware configuration illustrated in FIG. 5, as the slave station 20 of Embodiment 1 is, but the slave station 20A does not require a clock 22b-1. More specifically, hardware configuration is as follows.
(1) The data communication unit 21 and the RF-DC converting unit 22a are the same as their counterparts in Embodiment 1.
(2) The function of the power feeding pattern detection unit 42a is implemented by a CPU 96.
(3) The function of the wake-up management unit 42b is implemented by the CPU 96.
(4) The function of the identification number storage unit 42c is implemented by a RAM 98.

Figure 11:
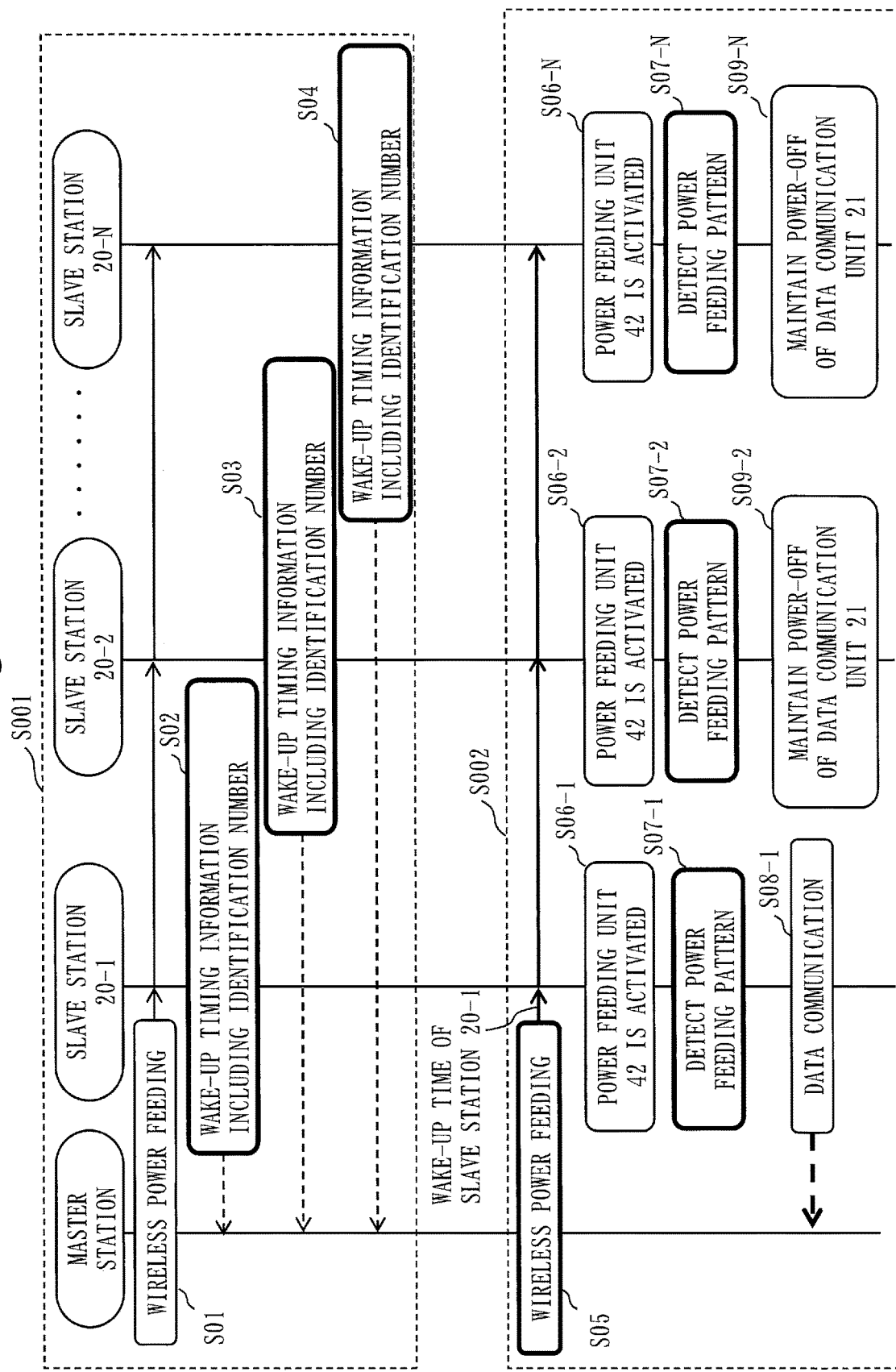
FIG. 11 for Embodiment 2 is a sequence diagram illustrating interaction between the master station 10A and the plurality of slave stations 20A.
Figure 12:
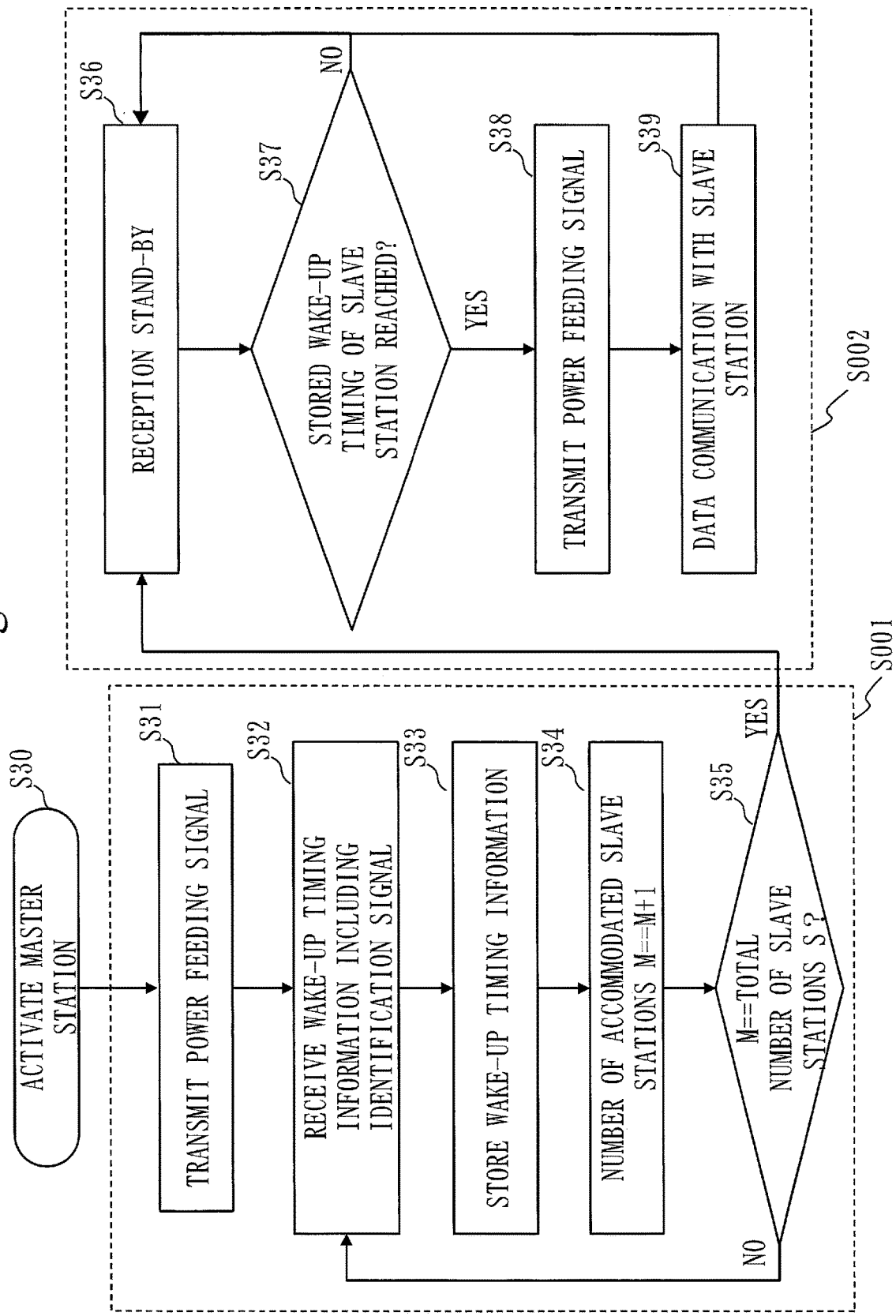
FIG. 12 for Embodiment 2 is a flowchart illustrating an operation of the master station 10A.
Figure 13:
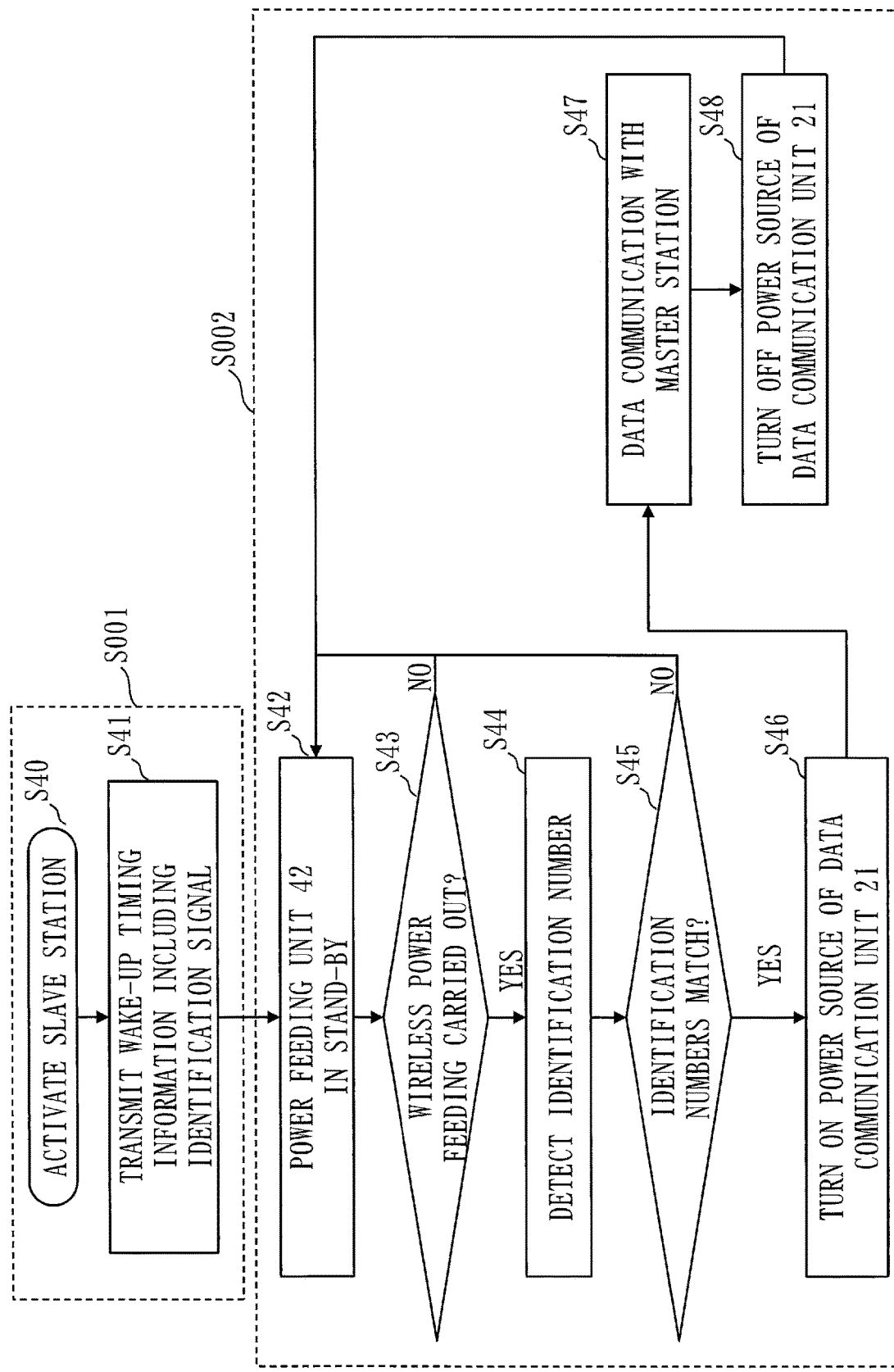
FIG. 13 for Embodiment 2 is a flowchart illustrating an operation of the slave station 20A.

FIG. 11 is a sequence diagram illustrating interaction between the master station 10A and the plurality of slave stations 20A. FIG. 12 is a flowchart illustrating an operation of the master station 10A. FIG. 13 is a flowchart illustrating an operation example of the slave station 20A. The communicating operation between the master station 10A and the plurality of slave stations 20A will be described with referring to FIGS. 11 to 13.

The outline of the interaction between the master station 10A and the plurality of slave stations 20A will be described with referring to FIG. 11. The description focuses on the differences from FIG. 6 of Embodiment 1. In FIG. 11 as well, interaction between the master station 10A and the plurality of slave station 20A is divided into accommodating process S001 of the slave station 20A and power feeding process S002.

With accommodating process S001, the master station 10A collects wake-up timing information from each of the N sets of slave stations 20A. The difference from Embodiment 1 is that wake-up timing information of Embodiment 2 essentially includes the identification number of the slave station 20A. The power feeding signal transmitted in step S01 of FIG. 11 is a common power feeding signal. The power feeding signal transmitted in step S05 of FIG. 11 is not a common power feeding signal but is a power feeding signal having a power feeding pattern according to each slave station 20A. This signal will be referred to as a pattern power feeding signal hereinafter.

With accommodating process S001 of FIG. 11, the master station 10A feeds power to the slave station 20A in the same manner as in Embodiment 1. The difference from Embodiment 1 is that the pattern feeding signal is transmitted in step S05 of FIG. 11. In steps S07-1, S07-2, S07-3 and so on, each slave station 20A determines whether a received pattern power feeding signal is directed to itself. If it is determined that the received pattern power feeding signal is directed to itself, the power source of the data communication unit 21 is turned on to start data communication with the master station 10A, as indicated in step S08-1. After the data communication ends, the power source of the data communication unit 21 is turned off.

The operation of the master station 10A will be described with referring to FIG. 12. In FIG. 12, the process corresponding to accommodating process S001 and the process corresponding to power feeding process S002 are each indicated by a broken-line frame.

In step S30, inside the master station 10A, the power source of the data communication unit 11 and the power source of the power feeding unit 32 are turned on, and the data communication unit 11 and the power feeding unit 32 are activated.

In step S31, the power feeding signal generation unit 32a transmits the common power feeding signal. Step S31 corresponds to step S01 of FIG. 11, and its contents are the same as the contents of step S11 of Embodiment 1.

Each slave station 20A is activated when it receives a common power feeding signal. Each activated slave station 20A transmits wake-up timing information including the identification number of itself to the master station 10A. This corresponds to steps S02 through S04 of FIG. 11.

In step S32, inside the master station 10A, the communication unit 11a receives wake-up timing information including the identification number and transmitted from each slave station 20A. In Embodiment 2, the wake-up timing information essentially includes an identification number in addition to the wake-up time and wake-up interval. In step S32, the master station 10A returns response data in the same manner as in step S12.

After receiving the wake-up timing information including the identification number, the signal processing unit 11b reads the identification number, the wake-up time, and the wake-up interval and notifies them to the wake-up timing management unit 32b. In step S33, the wake-up timing management unit 32b relates the wake-up time and the wake-up interval to the identification number of the slave station 20A and stores the resultant identification number in the wake-up pattern recording unit 32c.

In step S34, the signal processing unit 11b increments a number M of accommodated slave stations 20A by 1. The process of step S34 is the same as the process of step S14.

The operations of steps S32 through S34 are repeated until the accommodated number M to be incremented coincides with a number S of accommodated slave stations 20A preset in the master station 10A, as in Embodiment 1.

In step S35, if the accommodated number M coincides with the accommodated number S, the master station 10A is set to a reception waiting state (step S36). Steps S35 and S36 are identical with steps S15 and S16.

In step S37, the wake-up timing management unit 32b determines, with using the clock 32b-1, whether one of wake-up timings specified by the wake-up timing information recorded in the wake-up pattern recording unit 32c coincides with the current clock time. The process of step S37 is the same as the process of S17. The clock is implemented by the CPU 85 and the oscillator 86 as in Embodiment 1.

If the wake-up timing management unit 32b determines that the current clock time coincides with one of the plurality of wake-up timings (YES in step S37), the wake-up timing management unit 32b extracts the identification number of the wake-up timing that coincides with the clock time from the wake-up timing information stored in the wake-up pattern recording unit 32c. The wake-up timing management unit 32b transmits the detected identification number and an instruction signal instructing transmission of a power feeding signal to the power feeding signal generation unit 32a.

The identification number, the wake-up time, and the wake-up interval are determinative information for determining whether data communication should be started.

In step S38, when the power feeding signal generation unit 32a receives the identification number and the instruction signal from the wake-up timing management unit 32b, the power feeding signal generation unit 32a specifies the power feeding pattern from the identification number, generates a power feeding signal having the specified power feeding pattern, and transmits the generated power feeding signal. The CPU 85 constituting the power feeding signal generation unit 32a is programmed in advance to be able to specify the power feeding pattern from the identification number. The CPU 85 generates the power feeding signal having the specified power feeding pattern with using the RF circuit 84 and transmits the generated power feeding signal. This corresponds to step S05 of FIG. 11.

After the transmission of the power feeding signal, in step S39, the master station 10A performs data communication with the slave station 20A that has started data communication upon reception of the power feeding signal as a trigger. Assume that the slave station 20A that performs data communication is the slave station 20A-1. Inside the master station 10A, when data communication ends, the process returns to the reception waiting state of step S36 by the signal processing unit 11b. These processes correspond to steps S06-1, S07-1, and S08-1 of FIG. 11.

The operation of the slave station 20A will be described with referring to FIG. 13. In FIG. 13, a process corresponding to accommodating process S001 and a process corresponding to power feeding process S002 are each indicated by a broken-line frame.

In step S40, inside each slave station 20A, when the common power feeding signal from the master station 10A (corresponding to step S01 of FIG. 11) is received, the power source of a data communication unit 21 and the power source of a power feeding unit 22 are turned on.

In step S41, inside each slave station 20A, when the common power feeding signal is received, the data communication unit 21 transmits the identification number of the slave station which it belongs to, as being included in the wake-up timing information. More specifically, step S41 is as follows. The power feeding pattern detection unit 42a detects reception of the common power feeding signal via the RF-DC converting unit 22a. When reception of the common power feeding signal is detected, the power feeding pattern detection unit 42a transmits a detection signal to the wake-up management unit 42b. When the detection signal is received, the wake-up management unit 42b reads the identification number, the wake-up time, and the wake-up interval from the identification number storage unit 42c and transmits wake-up timing information which includes the identification number, the wake-up time, and the wake-up interval to a signal processing unit 21b. With using the communication unit 21a, the signal processing unit 21b transmits the wake-up timing information including the identification number. Step S41 corresponds to steps S02 through S04 of FIG. 11.

In step S42, when response data is received from the master station 10A, inside the slave station 20A, the signal processing unit 21b turns off the power source of the data communication unit 21 and keeps only the power feeding unit 42 in a power-on state. This process is the same as step S22.

Inside the slave station 20A, if the pattern power feeding signal transmitted by the master station 10A is received (YES in step S43), the power feeding pattern detection unit 42a detects reception of the pattern power feeding signal via the RF-DC converting unit 22a (YES in step S43). In step S44, upon reception of the pattern power feeding signal, the power feeding pattern detection unit 42a specifies the identification number from the power feeding pattern of the pattern power feeding signal. More specifically, a CPU 96 constituting the power feeding pattern detection unit 42a is programmed in advance to be able to specify the identification number from the power feeding pattern. The power feeding pattern detection unit 42a transmits the specified identification number to the wake-up management unit 42b.

In step S45, the wake-up management unit 42b compares the identification number received from the power feeding pattern detection unit 42a and the identification number stored in the identification number storage unit 42c, and determines whether the two identification numbers coincide. The identification number stored in the identification number storage unit 42c is collation information to be collated with the identification number received from the power feeding pattern detection unit 42a. The identification number received from the power feeding pattern detection unit 42a is pattern information indicating the transmission pattern of the the power feeding signal. Steps S44 and S45 correspond to steps S07-1 through S07-N of FIG. 11.

If it is determined that the two identification numbers coincide (YES in step S45), then in step S46, the wake-up management unit 42b turns on the power source of the data communication unit 21.

After that, in step S47, inside the data communication unit 21 whose power source is turned on, the signal processing unit 21b performs data communication with the master station 10A with using a communication unit 21a.

In step S48, when data communication by the data communication unit 21 ends, the wake-up management unit 42b turns off the power source of the data communication unit 21. The wake-up management unit 42b also keeps the power feeding unit 42 in the waiting state of step S42. After that, steps S42 through S48 are repeated.

A supplementary explanation will be given on the pattern power feeding signal generated by the master station 10A. In step S38 of FIG. 12, the pattern power feeding signal generated by the power feeding signal generation unit 32a of the master station 10A has been described. How the power feeding signal generation unit 32a generates the power feeding pattern can be presented by following examples 1 to 3.

EXAMPLE 1

As a power feeding pattern, the master station 10A holds different power transmission periods for different slave stations 20A to be woken up. The master station 10A transmits power with using the power transmission period of the slave station 20A to be woken up. The slave station 20A wakes up only when power is transmitted for the duration of its own power transmission period. That is, the wake-up management unit 42b turns on the power source of the data communication unit 21 only when the received power feeding signal indicates the power feeding pattern of the slave station which the wake-up management unit 42b belongs to. A specific example will be given. The slave station 20A-1 has identification number 1. As a power feeding pattern, the identification number 1 is related to a 1-second power transmission period of the power feeding signal. The slave station 20A-2 has identification number 2. As a power feeding pattern, the identification number 2 is related to a 2-second power transmission period of the power feeding signal. For the identification number 1, the power feeding signal generation unit 32a transmits a common power feeding signal for 1 second as a pattern power feeding signal. For the identification number 2, the power feeding signal generation unit 32a transmits a common power feeding signal for 2 seconds as a pattern power feeding signal.

EXAMPLE 2

As a power feeding pattern, the master station 10A transmits power with an on/off pattern by a pattern power feeding signal. The master station 10A holds different power transmission patterns consisting of on and off for different slave stations 20A to be woken up. The master station 10A transmits power with using a pattern power feeding signal being an on/off pattern of the slave station 20A to be woken up. The slave station 20A distinguishes the on/off power feeding pattern of power transmission and wakes up only when the power feeding pattern of the transmitted pattern power feeding signal coincides with the power feeding pattern of itself. That is, the wake-up management unit 42b turns on the power source of the data communication unit 21 only when the received power feeding signal indicates the power feeding pattern of the slave station which it belongs to.

EXAMPLE 3

As the identification information of its own, the slave station 20A holds in advance how power is fed differently, that is, characteristics such as reflection, diffraction attenuation, and so on, depending on the radio wave propagation environment according to the location it is installed. In this case, the power feeding signal transmitted by the master station 10A may be a common power feeding signal. When the slave station 20A receives the power feeding signal from the master station 10A, the slave station 20A wakes up only when the power feeding signal coincides with the identification information of itself That is, the wake-up management unit 42b turns on the power source of the data communication unit 21 only when the received power feeding signal indicates the power feeding pattern of the slave station which it belongs to.

<*Effect of Embodiment 2*>

As described above, according to the master station 10A and slave station 20A of Embodiment 2, with use of the pattern power feeding signal, clock driving while the slave station 20A waits for wireless power feeding becomes unnecessary. Therefore, a higher power consumption reduction effect than in Embodiment 1 can be obtained.

With respect to the above embodiments, FIGS. 3 and 5 illustrate hardware configurations. Instead of the hardware configurations of FIGS. 3 and 5, the "units" indicated in FIGS. 2 and 4 may be provided by "circuitry". Each "unit" may be replaced by a "circuit", a "stage", a "procedure", or a "process". With the "procedure" or "process", the functions of the master stations 10 and 10A and of the slave stations 20 and 20A are implemented by execution, by a computer, of the programs of the functions of the master stations 10 and 10A and of the slave stations 20 and 20A. That is, the power feeding apparatus, power receiving apparatus, and power feeding system described in the above embodiments can be regarded as a power feeding method, power source management method, power feeding program, and power source management program.

The "circuit" and "circuitry" are a concept that encompasses not only a CPU but also other types of processing circuits such as a logic IC, a GA (Gate Array), an ASIC (Application Specific Integrated Circuit), or an FPGA (Field-Programmable Gate Array).

REFERENCE SIGNS LIST

1: power feeding system; 10, 10A: master station; 11: data communication unit; 11a: communication unit; 11b: signal processing unit; 11c: storage unit; 11d: antenna; 12: power feeding unit; 12a: power feeding signal generation unit; 12b: wake-up timing management unit; 12c: wake-up time recording unit; 12d: antenna; 32a: power feeding signal generation unit; 32b: wake-up timing management unit; 32c: wake-up pattern recording unit; 20, 20A: slave station; 21: data communication unit; 21a: communication unit; 21b: signal processing unit; 21c: antenna; 22: power feeding unit; 22a: RF-DC converting unit; 22b: wake-up time management unit; 22c: wake-up time storage unit; 22d: antenna; 42a: power feeding pattern detection unit; 42b: wake-up management unit; 42c: identification number storage unit; 81: RF circuit; 82: CPU; 83: RAM; 84: RF circuit; 85: CPU; 86: oscillator; 87: RAM; 91: RF circuit; 92: CPU; 93: rectifier circuit; 94: DC/DC; 95: power capacitor; 96: CPU; 97: oscillator; 98: RAM; 101: power-feeding-side storage unit; 102: power-feeding-side determination unit; 103: power-feeding-side data communication unit; 201: power-receiving-side storage unit; 202: power-receiving-side determination unit; 203: power-receiving-side data communication unit

The invention claimed is:

1. A power feeding apparatus which transmits a power feeding signal that feeds power, to a power receiving apparatus, the power feeding apparatus comprising:
processing circuitry
storing time information which specifies a start time at which data communication with the power receiving apparatus should be started,
to determine whether the start time specified by the time information is reached and transmit the power feeding signal if it is determined that the start time is reached,
wherein the processing circuitry
stores identification information which identifies the power receiving apparatus, the identification information being related to the time information, and
when transmitting the power feeding signal, determines a transmission pattern of the power feeding signal corresponding to the identification information, the transmission pattern being used to cause the power receiving apparatus which receives the power feeding signal, to determine whether or not the data communication should be started, and transmits the power feeding signal with the determined transmission pattern,
the transmission pattern representing a power transmission period being a period during which the power feeding signal is transmitted continuously.

2. A power receiving apparatus which comprises a power-receiving-side data communication unit to perform data communication with a power feeding apparatus and receives a power feeding signal that feeds power, from the power feeding apparatus which transmits the power feeding signal, the power receiving apparatus comprising:
processing circuitry
storing determinative information used for determining whether or not data communication with the power feeding apparatus should be started,
to determine whether or not the data communication should be started, when the power feeding signal is received, using the determinative information; turn on a power source of the power-receiving-side data communication unit when it is determined that the data communication should be started and cause the power-receiving-side data communication unit to perform data communication with the power feeding apparatus; and turn off the power source of the power-receiving-side data communication unit when the data communication by the power-receiving side data communication unit with the power feeding apparatus ends,
wherein the processing circuitry
stores, as the determinative information, collation information to be collated with pattern information indicating a transmission pattern of the power feeding signal, and
detects the pattern information of the power feeding signal, compares the detected pattern information and the collation information with each other, and determines that the data communication should be started if, as a result of comparison, the pattern information represents the collation information,
the collation information stored representing at least either one of
information of a power transmission period being a period during which the power feeding signal is transmitted continuously, and
information of propagation characteristics of a radio wave received as the power feeding signal.

3. A power feeding system comprising:
a power feeding apparatus to transmit a power feeding signal that feeds power; and
a power receiving apparatus to receive the power feeding signal from the power feeding apparatus and perform data communication with the power feeding apparatus,
wherein the power feeding apparatus comprises
a power-feeding-side storage unit storing identification information which identifies the power receiving apparatus, the identification information being related to time information which specifies a start time at which the data communication with the power receiving apparatus should be started,
a power-feeding-side determination unit to determine whether the start time specified by the time information is reached, and if it is determined that the start time is reached, determine a power transmission period being a period during which the power feeding signal is transmitted continuously, as a transmission pattern of the power feeding signal corresponding to the identification information, the transmission pattern being used to cause the power receiving apparatus which receives the power feeding signal, to determine whether or not the data communication should be started, and transmit the power feeding signal with the determined transmission pattern, and
a power-feeding-side data communication unit to perform data communication with the power receiving apparatus, and
wherein the power receiving apparatus comprises
a power-receiving-side storage unit storing, as determinative information used for determining whether or not the data communication with the power feeding apparatus should be started, at least either one piece of collation information out of information of the power transmission period, being collation information to be collated with pattern information indicating a transmission pattern of the power feeding signal, and information of propagation characteristics, being the collation information, of a radio wave received as the power feeding signal, a power-receiving-side data communication unit to perform data communication with the power-feeding-side data communication unit, and a power-receiving-side determination unit to detect the pattern information of the power feeding signal, when the power feeding signal is received, compare the detected pattern information and the collation information with each other, and determine that the data communication should be started if, as a result of comparison, the pattern information represents the collation information; turn on a power source of the power-receiving-side data communication unit when it is determined that the data communication should be started and cause the power-receiving-side data communication unit to perform data communication with the power-feeding-side data communication unit; and turn off the power source of the power-receiving-side data communication unit when the data communication by the power-receiving side data communication unit with the power-feeding-side data communication unit ends.

4. A power feeding method, by a computer being a power feeding apparatus which transmits a power feeding signal that feeds power, to a power receiving apparatus, and which comprises a power-feeding-side storage unit storing identification information which identifies the power receiving apparatus, the identification information being related to time information which specifies a start time at which data communication with the power receiving apparatus should be started, the power feeding method comprising:

determining whether the start time specified by the time information is reached; and if it is determined that the start time is reached, determining a power transmission period being a period during which the power feeding signal is transmitted continuously, as a transmission pattern of the power feeding signal corresponding to the identification information, the transmission pattern being used to cause the power receiving apparatus which receives the power feeding signal, to determine whether or not the data communication should be started, and transmitting the power feeding signal with the determined transmission pattern.

5. A power source management method, by a computer being a power receiving apparatus including a power-receiving-side data communication unit and a power-receiving-side storage unit, the power-receiving-side data communication unit performing data communication with a power feeding apparatus which transmits a power feeding signal that feeds power, the power-receiving-side storage unit storing, as determinative information used for determining whether or not data communication with the power feeding apparatus should be started, collation information to be collated with pattern information indicating a transmission pattern of the power feeding signal, the power source management method comprising:

storing, in the power-receiving-side storage unit, at least either one piece of information out of information of a power transmission period being a period during which the power feeding signal is transmitted continuously and information of propagation characteristics of a radio wave received as the power feeding signal, as the collation information;

detecting the pattern information of the power feeding signal, when the power feeding signal is received; comparing the detected pattern information and the collation information with each other; and determining that the data communication should be started if, as a result of comparison, the pattern information represents the collation information, and turning on a power source of the power-receiving-side data communication unit when it is determined that the data communication should be started, to cause the power-receiving-side data communication unit to perform data communication with the power feeding apparatus, and turning off the power source of the power-receiving-side data communication unit when the data communication by the power-receiving side data communication unit with the power feeding apparatus ends.

6. A non-transitory computer readable recording medium storing a power feeding program for causing a computer, being a power feeding apparatus which transmits a power feeding signal that feeds power, to a power receiving apparatus, and which comprises a power-feeding-side storage unit storing identification information which identifies the power receiving apparatus, the identification information being related to time information which specifies a start time at which data communication with the power receiving apparatus should be started, to execute:

a process of determining whether the start time specified by the time information is reached;

a process of, if it is determined that the start time is reached, determining a power transmission period being a period during which the power feeding signal is transmitted continuously, as a transmission pattern of the power feeding signal corresponding to the identification information, the transmission pattern being used to cause the power receiving apparatus which receives the power feeding signal, to determine whether or not the data communication should be started, and a process of transmitting the power feeding signal with the determined transmission pattern.

7. A non-transitory computer readable recording medium storing a power source management program for causing a computer, being a power receiving apparatus including a power-receiving-side data communication unit which performs data communication with a power feeding apparatus which transmits a power feeding signal that feeds power, and a power-receiving-side storage unit which stores, as determinative information used for determining whether or not data communication with the power feeding apparatus should be started, collation information to be collated with pattern information indicating a transmission pattern of the power feeding signal, to execute:

a process of storing, in the power-receiving-side storage unit, at least either one piece of information out of information of a power transmission period being a period during which the power feeding signal is transmitted continuously and information of propagation characteristics of a radio wave received as the power feeding signal, as the collation information;

a process of detecting the pattern information of the power feeding signal; when the power feeding signal is received, comparing the detected pattern information and the collation information with each other; and determining that the data communication should be started if, as a result of comparison, the pattern information represents the collation information; and a process of turning on a power source of the power-receiving-side data communication unit when it is determined that the data communication should be started, to cause the power-receiving-side data communication unit to perform data communication with the power feeding apparatus, and turning off the power source of the power-receiving-side data communication unit when the data communication by the power-receiving side data communication unit with the power feeding apparatus ends.

* * * * *